Figure 1:
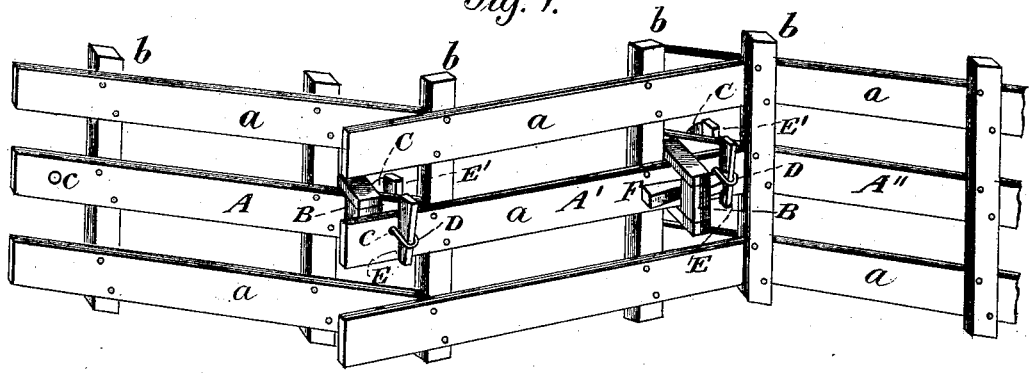

(No Model.)

C. W. MEYER.
FENCE.

No. 341,037. Patented May 4, 1886.

Witnesses.
A. Ruppert.
Alfred T. Gage.

Inventor:
Chas. W. Meyer
by Franklin H. Hough
Attorney

UNITED STATES PATENT OFFICE.

CHARLES WILLIAM MEYER, OF MOSCOW MILLS, MISSOURI.

FENCE.

SPECIFICATION forming part of Letters Patent No. 341,037, dated May 4, 1886.

Application filed March 2, 1886. Serial No. 193,776. (No model.)

*To all whom it may concern:*

Be it known that I, CHARLES WILLIAM MEYER, a citizen of the United States, residing at Moscow Mills, in the county of Lincoln and State of Missouri, have invented certain new and useful Improvements in Fences; and I do hereby declare the following to be a full, clear, and exact description of the invention, such as will enable others skilled in the art to which it appertains to make and use the same, reference being had to the accompanying drawings and letters of reference marked thereon, which form a part of this specification.

Like letters refer to similar parts throughout the several views.

This invention relates to certain new and useful improvements in fences of that class wherein the fence is composed of detachable sections, and has for its object to provide a fence of this class which can be easily and readily put up, either in the form of a straight fence or zigzag, and by which the worm of the fence can be readily changed from right to left or left to right, as may be desired.

To these ends, and to such others as the invention may pertain, the same consists in the peculiar combinations and the novel construction and arrangement of parts, all as more fully hereinafter described, shown in the drawings, and particularly pointed out in the claims.

Figure 2:
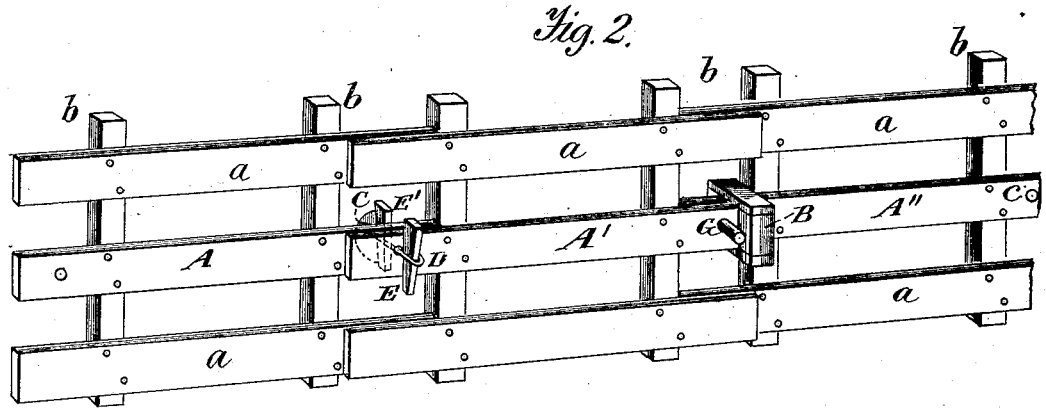
Figure 3:
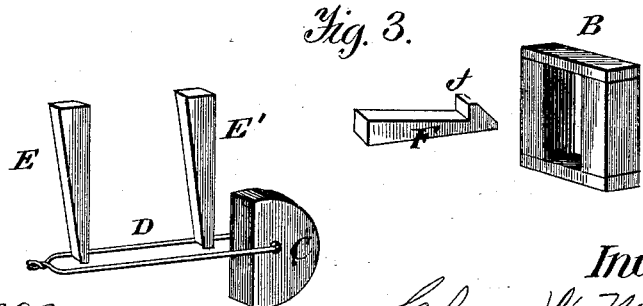

Referring to the drawings, Figure 1 is a perspective view of a plurality of sections of fence constructed in accordance with my invention, showing the same arranged zigzag. Fig. 2 is a similar view showing the manner of forming a straight fence; Fig. 3, perspective details of the various parts employed in connecting the adjacent sections detached.

Referring by letter to the said drawings, A A' A'' designate each a section of fence, composed, preferably, of three longitudinal rails, $a$, joined together in any suitable way by the uprights $b$, each and all of the sections being alike. Each center rail is provided near either end with a hole, $c$, for the purpose hereinafter described.

B is a yoke of any suitable material, preferably of the form shown, the opening of which should be of such a size as to receive the ends of the two adjacent planks or rails.

C is a block of any desired form, provided with a hole, through which is passed a wire or cord, D.

E E' are wedges of any suitable material.

F is a key, provided with a hook, $f$, for a purpose hereinafter explained.

I will now describe the manner of putting up the fence.

Supposing that it is desired to make a straight fence, the sections are placed together, with the adjacent ends overlapping, as shown in Fig. 2, in which position they can be easily and quickly secured together by simply slipping the ends of the center rails through one of the yokes and passing a pin, G, through the holes in the said center rails; or the yoke may be omitted and the sections secured by the pin alone; but the preferable way of securing the sections together is as follows: The wire D is passed through the holes from one side of the fence, and the wedge E is then passed through the bight of the wire on the opposite side of the fence. The wedge E' is then passed through the strands of the wire between the center rail and the block C, and by driving the wedge the rails are drawn together, and thereby secured. The block C serves as a bearing for the wedge E', and prevents the wire from cutting said wedge, and also serves as a bearing for the wedge.

In order to make a zigzag fence, the end of the center rail of one of the adjoining sections is slipped through one of the yokes, and the sections are then joined together by the wire, block, and wedges, in the manner just described. The key F is then placed in the yoke, between the same and the center rail, causing the center rail of the adjoining section to bear upon said yoke and rail. In order to reverse the worm of the fence, it is simply necessary to reverse the yoke.

While I have shown the center rails provided with holes, and prefer this construction, I do not wish to confine myself thereto, as it is evident that the top or bottom rail, or both, may be provided with holes for the same purpose.

Having thus described my invention and set forth its merits, what I claim as new, and desire to secure by Letters Patent, is—

1. The combination, with the fence-sections, the center rails of which are provided with holes, as shown, of the wire D, one bearing upon the outer face of each of the center rails, and the whole adapted to serve either with or without the yoke B, substantially as and for the purposes specified.

2. The combination, with the fence-sections, the center rails of which are provided with holes, as shown, of the block C, wire D, secured thereto, the yoke B, and the wedges E E', bearing against the outer faces of said center rails, substantially as and for the purpose specified.

3. The combination, with the fence sections provided with holes at each end, as shown, of the wire D, passed through said holes, block C on said wire, wedges E E', yoke B, and key F, all arranged and constructed for joint operation substantially as described.

4. The combination, with the sections A A', the center rails of which are provided with holes c, of a rectangular wire, D, block C, secured thereto, yoke B, sleeved on one of said center rails, wedge E, inserted between the bight of said wire and the outer face of one of said rails, the wedge E' between the block C and the outer face of the other rail, and the removable key F in said yoke, all substantially as and for the purpose specified.

In testimony whereof I affix my signature in presence of two witnesses.

CHARLES WILLIAM MEYER.

Witnesses:
BENJM. W. WHEELER,
JESSE J. SHAW.